Aug. 8, 1933.  A. T. POTTER  1,921,262
CONTROL MEANS FOR WINDSHIELDS
Filed Dec. 17, 1931

INVENTOR
Albert T. Potter.
BY
Harness, Dickey, Pierce &
ATTORNEYS.

Patented Aug. 8, 1933

1,921,262

UNITED STATES PATENT OFFICE 1,921,262

CONTROL MEANS FOR WINDSHIELDS

Albert T. Potter, Detroit, Mich., assignor to Ainsworth Manufacturing Corporation, a Corporation of Michigan Application December 17, 1931. Serial No. 581,648

3 Claims. (Cl. 296—84)

My invention relates to closure regulators and it has particular relation to regulators employed for maintaining windshields of vehicles in various positions of adjustment.

The invention has for its main objects the provision of a regulating device embodying a slotted link which is concealed when the windshield is closed; the provision of a windshield regulating link which does not obstruct the front doorway when the windshield is partially opened; the provision of a regulator for tiltable windshields which may be controlled by one hand; the provision of a windshield regulator which effectively maintains a tiltable windshield in any predetermined position of adjustment; the provision of a windshield regulator provided with means whereby the windshield may be positively locked in a predetermined position of adjustment, or impositively secured in position while the positive means is being adjusted; the provision of a windshield regulating device of the above indicated character which is simple in construction and efficient and durable in operation.

In certain makes of closed automobiles the windshields are hinged along the top edges thereof to the upper edge of the windshield opening in such manner that the lower edge of the windshield may be swung outwardly to permit the circulation of air through the vehicle body. In such constructions the windshield is held in various positions of adjustment by means of a link pivotally secured either to the body of the vehicle or to the windshield. The link is clamped in various positions of adjustment by means of a screw extending through the slot in the link and having a clamping nut threaded thereupon.

Such constructions in actual practice have been found undesirable because of difficulty involved in operating them while the vehicle was in motion. This was true because when the clamping nut was loosened in such manner as to permit the windshield to be swung outwardly or inwardly it was necessary for the operator manually to hold the windshield in the desired position of adjustment while the clamping screw was being tightened up in order permanently to hold it in position. Obviously, with such construction the use of both hands for making the adjustment was necessary. Therefore, in order to regulate the windshield it was necessary to bring the vehicle completely to a stop in order that the driver might have both hands free for manipulating the various elements. Also, the links were exposed in the interior of the car and when the windshields were in certain positions of adjustment they projected backwardly and tended to obstruct the doorway.

This invention comprises a link regulator for windshields which is hinged within a front post to swing forwardly away from the doorway and in which the clamping nut is provided with a resiliently actuated clamping device adapted impositively to maintain the windshield in a predetermined position of adjustment by friction clamping action until the clamping screw can be tightened up in order permanently to secure the regulator in the desired position.

For a more complete understanding of the invention, reference may now be had to the accompanying drawing, in which—

Figure 1:
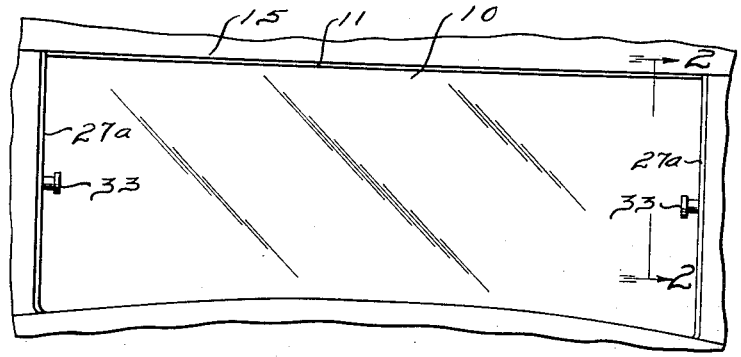
Fig. 1 is a fragmentary elevational view of a conventional windshield in connection with which my improved regulating device may be employed.

In practicing the invention a windshield 10 having a frame 11 of conventional design is provided at its upper edge with a hinge 12 comprising inner and outer nested involute flanges 13 and 14, the latter of which is secured to a member 15 which is attached to the edge of the windshield opening.

Figure 3:
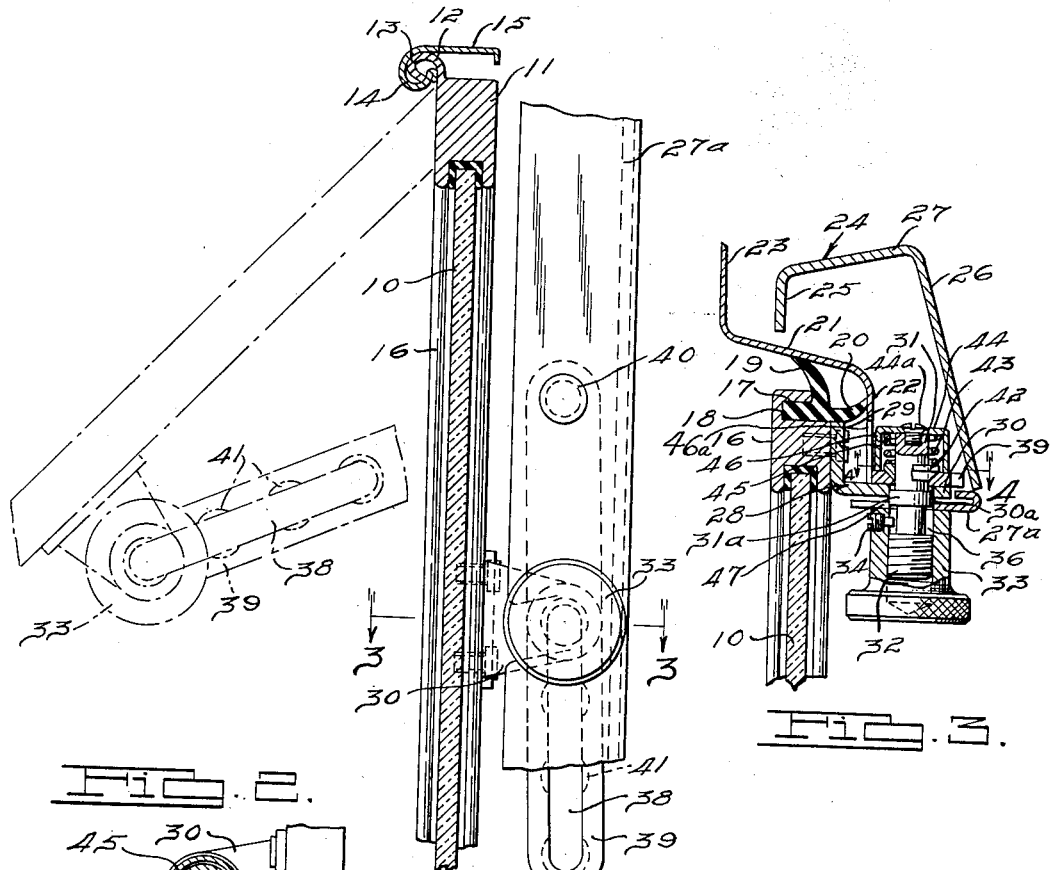
Fig. 3 is a fragmentary cross-sectional view taken substantially upon the line 3—3 of Fig. 2.

As shown in Fig. 3, the inner faces of the lateral portions 16 of the windshield frame may be provided with channels 17 adapted to receive the base portion of a weatherstrip 18 of rubber or other convenient resilient material. This weatherstrip exteriorally of the channel 17 is provided with a laterally projecting flange 19 and a rearwardly projecting flange 20, the edges of which respectively engage a forwardly and outwardly sloping shoulder 21 and an inwardly directed flange 22 formed integrally therewith which form continuations of a plate 23 constituting the forward face of a front body post.

A stationary frame member 24 of channel-like construction is disposed in parallelism to the shoulder 21 and consists of a relatively narrow side or face 25, a relatively wide face or side 26 and an interconnecting web 27. The edge of the side 25 terminates adjacent to the shoulder 21 while the edge of the side 26 extends inwardly and rearwardly in overlapping but spaced relation with respect to the margin of the windshield.

As best shown in Fig. 3, the space between the outer edge of the channel 24 and the windshield when the latter is in perpendicular position is approximately closed by means of a vertical plate or garnish molding 27a which is secured in position in any convenient manner.

In Fig. 3 is also shown a bracket 28 of L-shape having a base portion 29 secured to the inner face of the frame portion 11 of the windshield and having an inwardly directed flange 30 which is bored at 30a rotatably and slidably to receive a flange 31a upon a pin 31. The pin is provided at its inner end with a threaded portion 32 upon which is threaded a knurled nut 33 that contacts at its outer end when the windshield is closed with the plate 27a. A small set screw 34 extends through the side portion of the nut 33 and the inner end thereof extends into a peripheral groove about the pin 31 in such manner as to limit outward travel of said nut upon the latter.

Figures 2, 4, 5:
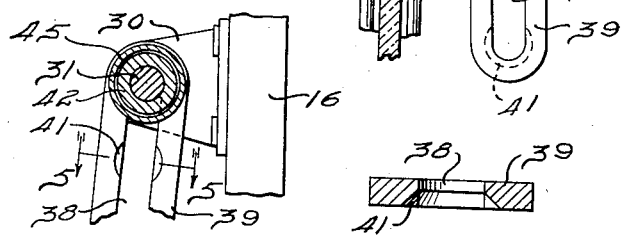
Fig. 2 is a fragmentary cross-sectional view taken substantially upon the line 2—2 of Fig. 1.
Fig. 4 is a fragmentary cross-sectional view taken substantially upon the line 4—4 of Fig. 3.
Fig. 5 is a cross-sectional view taken substantially upon the line 5—5 of Fig. 4.

As best shown in Figs. 2 and 3, the pin 31 extends outwardly through a slot 38 formed in an adjusting link 39 that swings between the plate 27a and the edge of plate 23 and at its upper end is pivoted upon a pin 40 extending outwardly from the concealed face of the plate 27a. It will be appreciated that the link is of such length and so positioned that the end thereof will at all times clear the glass of the windshield. The link is also provided with a series of conical recesses or seats 41 for a clamping member or ring 42 which is axially slidable upon the pin 31. Member 42 is maintained in engagement with the link by means of a coil compression spring 43 disposed about the pin and engaging at one end with the clamping member 42 and at the other end with the bottom portion 44 of a cup-like member 46 having side wall portions 45. Member 44 is secured in position by a screw 44a threaded into the end of the pin. The edges of the side wall portions of the cup engage the adjacent face of the link 39 and when the nut 33 is tightened up function to bind the latter against the portion 30 of the bracket 28, thus securing the link firmly and in any desired position of adjustment. The cup-like member passes outwardly when the windshield is opened through a notch 46a in the plate portion 21 and the body of the pin 31 passes through a corresponding notch or slot 47 in the plate 27a.

In the operation of the device, it will be assumed that the windshield is in vertical position with the flanges 19 and 20 of the weatherstrip 18 engaging respectively with the shoulder 21 and the flange 22 of the vehicle body post and the nut 33 engaging the plate 27a. Under these conditions, if the operator desires to open the windshield he merely loosens the clamping nut 33 and presses outwardly upon the windshield frame thus swinging it into some position of adjustment, for example, as indicated in dot-and-dash line in Fig. 2. During this outward movement the nut disengages from the plate 27a. At the same time, the clamping member 42 slides in the slot 38 and engages the various seats and the flange 31a is drawn through the opening 30a in bracket 28 to engage the other side of the link. The pressure exerted against the clamping member by means of the coil spring 43 is comparatively small and may be overcome by the exertion of a moderate force against the windshield. However, the binding engagement between the clamping member and the link 39 is sufficient when the clamping member drops into a seat 41 to maintain the windshield in position against the force ordinarily exerted by air pressure due to the progress of the vehicle or the weight of the parts for a period sufficiently long to permit the operator to tighten up the clamping nut 33. The latter operation brings the edges of the side wall portion 45 of the cup member upon the pin 31 into engagement with the adjacent face of the link 39. The latter element is thus clamped securely between the said marginal edges and the face of portion 30 of the bracket 28.

Obviously, the windshield may be closed merely by loosening the nut 33 and swinging the windshield inwardly by the application of manual force. It is thus apparent that I have provided means for automatically holding a windshield in any predetermined position of adjustment while the clamping device therefor is being tightened up. By this construction a windshield is provided which may be operated by one hand, thus permitting the opening or closing of the windshield while the vehicle is in full motion.

It will also be appreciated that the flanges of the cup 45 by engaging the link 39 function to clamp the latter against the bracket 28 when the nut 33 is tightened without exertion of undue distorting force upon the spring 43. The mechanism is substantially concealed when the windshield is closed and at all times the regulating mechanism is maintained clear of the doorway.

Although I have described only the preferred embodiment of the invention, it is to be understood that the latter is not limited to this particular form but that various modifications may be made in the basic structure without departure from the spirit of the invention or the scope of the appended claims.

I claim:

1. In combination, a windshield hingedly connected at one edge to a vehicle body, a windshield regulator comprising a link interconnecting the body and the windshield, one end of said link being pivoted to the body and the other end of said link being slidably pivoted to the windshield, clamping means for securing said link in various adjusted positions, the sides of said windshield overlapping inwardly extending flanges on the vehicle body front corner pillars or posts, said inwardly extending flanges having notches therein for receiving said link clamping means and a garnish moulding for covering said link when the windshield is in closed position, said moulding having a slot therein for receiving said link clamping means.

2. In combination, a windshield hingedly connected at one edge to a vehicle body, a windshield regulator comprising a link interconnecting the body and the windshield, one end of said link being pivoted to the body and the other end of said link being slidably pivoted to the windshield, clamping means for securing said link in various adjusted positions, said clamping means comprising a pin, a ring axially slidable on said pin, a cup having its bottom fixed to an end of said pin and its rim in spaced surrounding relation thereto, a helical compression spring surrounding the enclosed end of the pin within the cup and bearing between the bottom of the cup and said ring, the edge of the cup rim being arranged to engage said link before said spring is fully compressed, the opposite end of said pin being threaded and a nut threaded on said threaded pin end for moving said pin axially.

3. In combination, a windshield hingedly connected at one edge to a vehicle body, a windshield regulator comprising a link interconnecting the body and the windshield, one end of said link being pivoted to the body and the other end of said link being slidably pivoted to the windshield, clamping means for securing said link in various adjusted positions, said clamping means comprising a pin, a ring axially slidable on said pin, a cup having its bottom fixed to an end of said pin and its rim in spaced surrounding relation thereto, a helical compression spring surrounding the enclosed end of the pin within the cup and bearing between the bottom of the cup and said ring, the edge of the cup rim being arranged to engage said link before said spring is fully compressed, the opposite end of said pin being threaded, a nut threaded on said threaded pin end for moving said pin axially, and a retainer for normally preventing the removal of said nut.

ALBERT T. POTTER.